(12) United States Patent  (10) Patent No.: US 9,136,904 B2
Ali et al.  (45) Date of Patent: Sep. 15, 2015

(54) HIGH BANDWIDTH EQUALIZER AND LIMITING AMPLIFIER

(75) Inventors: Tamer Ali, Irvine, CA (US); Ali Nazemi, Aliso Viejo, CA (US); Namik Kocaman, San Clemente, CA (US)

(73) Assignee: Broadcom Corporation, Irvine, CA (US)

( * ) Notice: Subject to any disclaimer, the term of this patent is extended or adjusted under 35 U.S.C. 154(b) by 198 days.

(21) Appl. No.: 13/567,721

(22) Filed: Aug. 6, 2012

(65) Prior Publication Data

US 2014/0036982 A1  Feb. 6, 2014

(51) Int. Cl.
| | |
|---|---|
| H04L 25/06 | (2006.01) |
| H04B 3/04 | (2006.01) |
| H04B 3/14 | (2006.01) |
| H04L 25/03 | (2006.01) |
| H04L 27/00 | (2006.01) |

(52) U.S. Cl.
CPC .. *H04B 3/04* (2013.01); *H04B 3/14* (2013.01); *H04L 25/03878* (2013.01); *H04L 25/063* (2013.01); *H04L 27/0002* (2013.01)

(58) Field of Classification Search
CPC .......... H04B 3/04; H04B 3/14; H04L 27/002; H04L 25/063; H04L 25/03878
USPC .......... 375/222, 229, 232, 317, 318
See application file for complete search history.

(56) References Cited

U.S. PATENT DOCUMENTS

| | | | |
|---|---|---|---|
| 6,542,540 B1 * | 4/2003 | Leung et al. | 375/232 |
| 8,466,748 B2 | 6/2013 | Rau | |
| 2002/0122504 A1 * | 9/2002 | Payne et al. | 375/317 |
| 2003/0102908 A1 * | 6/2003 | Ausserlechner et al. | 330/9 |
| 2009/0273370 A1 * | 11/2009 | Shinde | 326/115 |
| 2010/0194478 A1 * | 8/2010 | Maillard | 330/254 |

(Continued)

FOREIGN PATENT DOCUMENTS

| | | |
|---|---|---|
| CN | 102281035 | 12/2011 |
| EP | 1 447 950 A1 | 8/2004 |

(Continued)

OTHER PUBLICATIONS

European Search Report directed toward European Patent Application No. 13003596.7, dated Dec. 3, 2013, European Patent Office, The Hague; 3 pages.

(Continued)

*Primary Examiner* — Syed Haider
(74) *Attorney, Agent, or Firm* — Sterne, Kessler, Goldstein & Fox P.L.L.C.

(57) ABSTRACT

Embodiments of the present disclosure enable bandwidth extension of receiver front-end circuits without the use of inductors. As a result, significantly smaller and cheaper receiver implementations are made possible. In an embodiment, bandwidth extension is achieved by virtue of very small floating capacitors that are coupled around amplifier stages of the receiver front-end circuit. Each of the capacitors is configured to generate a negative capacitance for the preceding stage (e.g., equalizer or amplifier), thus extending the bandwidth of the preceding stage. A capacitively-degenerated cross-coupled transistor pair allows bandwidth extension for the final (e.g., amplifier) stage. Embodiments further enable DC offset compensation with the use of a digital feedback loop. The feedback loop can thus be turned on/off as needed, reducing power consumption.

20 Claims, 6 Drawing Sheets

(56) References Cited

U.S. PATENT DOCUMENTS

| | | | |
|---|---|---|---|
| 2011/0234312 A1* | 9/2011 | Lachhwani et al. | 330/104 |
| 2012/0299654 A1* | 11/2012 | Hou | 330/260 |
| 2012/0326779 A1* | 12/2012 | Rau | 330/76 |

FOREIGN PATENT DOCUMENTS

| | | | |
|---|---|---|---|
| EP | 1 622 285 | A2 | 2/2006 |
| EP | 2 369 742 | A1 | 9/2011 |

OTHER PUBLICATIONS

Korean Office Action directed toward related KR Application No. 10-2013-0093136, dated Jul. 25, 2014 from the Korean Intellectual Property Office; 9 pages.

Office Action directed to related Taiwanese Patent Application No. 102127522, mailed Feb. 12, 2015. 6 pages.

\* cited by examiner

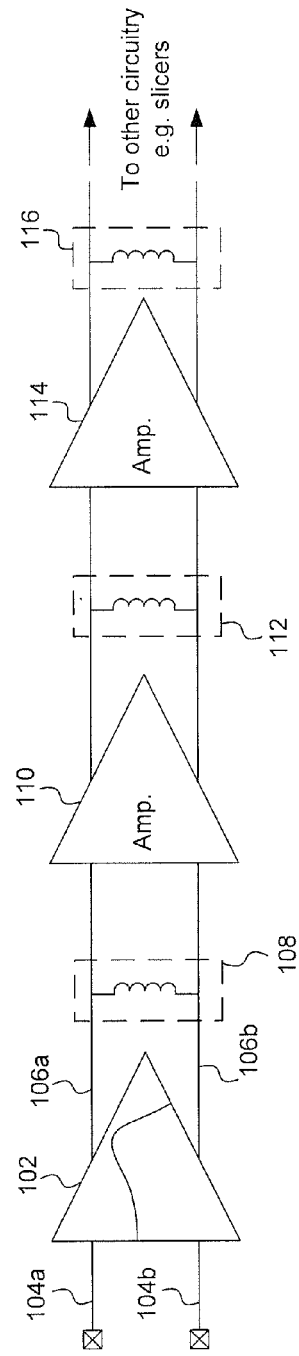
FIG. 1
(Conventional)

HIGH BANDWIDTH EQUALIZER AND LIMITING AMPLIFIER

BACKGROUND

1. Field of the Invention

The present disclosure relates generally to equalization, amplification, and offset compensation.

2. Background Art

Conventional bandwidth extension of a receiver front-end circuit relies on large inductors placed after the various stages of the front-end circuit to extend their respective bandwidths. This is undesirable for cost and circuit area considerations. In addition, conventional receiver front-end circuits make use of analog feedback schemes to reduce device offsets. The analog schemes are power consuming and require large areas for implementation.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

FIG. 1 illustrates a portion of a conventional receiver front-end circuit.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 2:
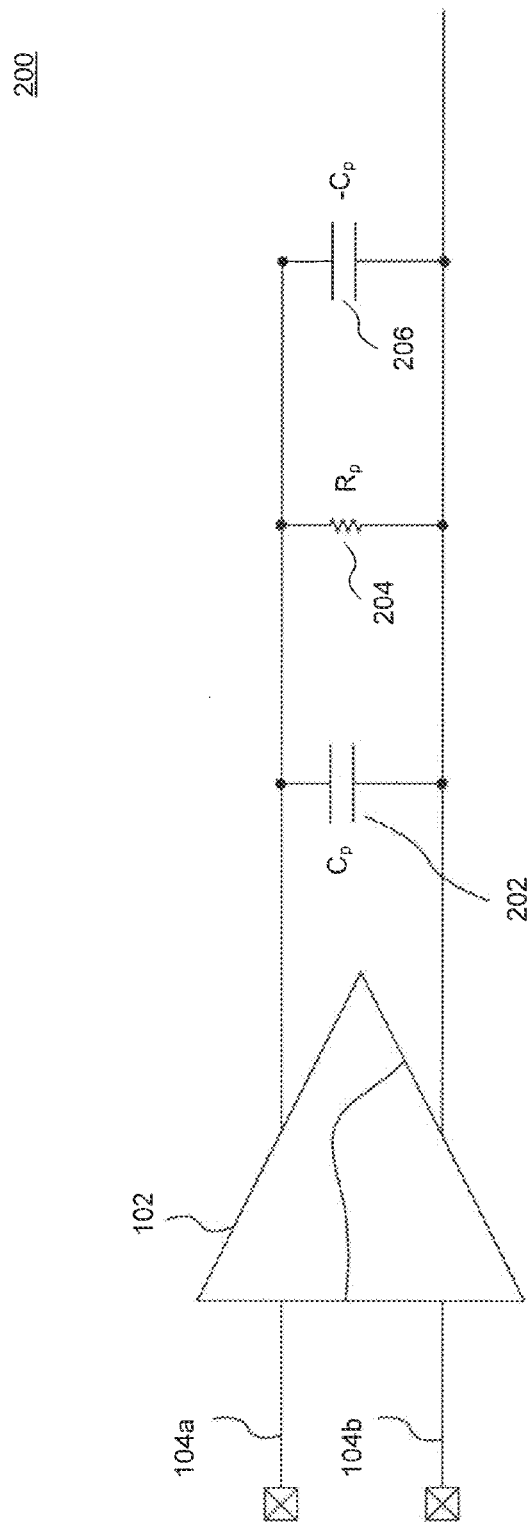
FIG. 2 is an example circuit that illustrates an example embodiment of the present disclosure.

FIG. 1 illustrates a portion of a conventional receiver front-end circuit 100. As shown in FIG. 1, receiver front-end circuit 100 includes a peaking equalizer 102, followed by a plurality of amplifiers 110 and 114. Peaking equalizer 102 is configured to receive differential input data signals 104a and 104b, and to generate differential output data signals 106a and 106b. Differential output data signals 106a and 106b are coupled to amplifiers 110 and 114, before being provided to other circuitry, such as data slicers, for example. Amplifiers 110 and 114 may be limiting amplifiers, configured to attenuate or limit the portions of signals 106a and 106b that are above a certain level, in order to prevent saturation of subsequent stages.

For high data rate applications, differential input data signals 104a and 104b may have higher bandwidth than the respective bandwidths of equalizer 102 and amplifiers 110 and 114. Traditionally, therefore, large inductors, such as inductors 108, 112, and 116 shown in FIG. 1, are placed on-chip after equalizer 102, amplifier 110, and amplifier 114. Inductors 108, 112, and 116 serve to extend the respective bandwidths of equalizer 102, amplifier 110, and amplifier 114, such that receiver front-end circuit 100 can handle the high bandwidth differential input data signals 104a and 104b.

Typically, however, inductors are large in size, which increases significantly the silicon area of conventional receiver front-end implementations. For example, in typical implementations, the area required for one or two inductors, such as inductors 108, 112, and 116, may be as large as the area required for the entire associated receiver circuit. Accordingly, there is a need to eliminate inductors from receiver front-end circuits. At the same time, bandwidth extension is desired for high data rate applications.

Embodiments of the present disclosure, as farther described below, enable bandwidth extension of receiver front-end circuits without the use of inductors. Alternatively, embodiments may be used together with inductors to enable bandwidth extension. As a result, significantly smaller and cheaper receiver implementations are made possible. In embodiments, bandwidth extension of a stage (e.g., equalizer, amplifier, etc.) is achieved by negating its inherent capacitance, which generally limits its bandwidth. This concept of the present disclosure is further described below with respect to an example circuit 200 in FIG. 2.

As shown in FIG. 2, example circuit 200 includes equalizer 102, a capacitor 202, a resistor 204, and a negative capacitor 206. Capacitor 202 and resistor 204 represent the parasitic capacitance and resistance of equalizer 102. In other embodiments, the load capacitance of the succeeding stage is larger than the parasitic capacitance of equalizer 102, and thus capacitor 202 represents the combined capacitance of the parasitic capacitance of equalizer 102 and the load capacitance of the succeeding stage. As shown in FIG. 2, the parasitic capacitance and resistance appear as output load capacitance and resistance, respectively, coupled to the output of equalizer 102. The output load capacitance reduces the bandwidth of equalizer 102.

Embodiments of the present disclosure, as further described, below emulate the presence of a negative capacitance at the output of the stage whose bandwidth is being extended. For example, as shown in FIG. 2, embodiments emulate the presence of negative capacitor 206 at the output of equalizer 102. Capacitor 206 negates the capacitance of capacitor 202, thereby reducing the bandwidth limiting effect of capacitor 202.

In an embodiment, bandwidth extension is achieved by virtue of very small floating capacitors that are coupled around amplifier stages of the receiver front-end circuit. Each capacitor and associated amplifier stage are configured to generate a negative capacitance for the preceding stage (e.g., equalizer or amplifier), thus extending the bandwidth of the preceding stage. A capacitively-degenerated cross-coupled differential pair allows bandwidth extension for the final (e.g., amplifier) stage.

Figure 3:
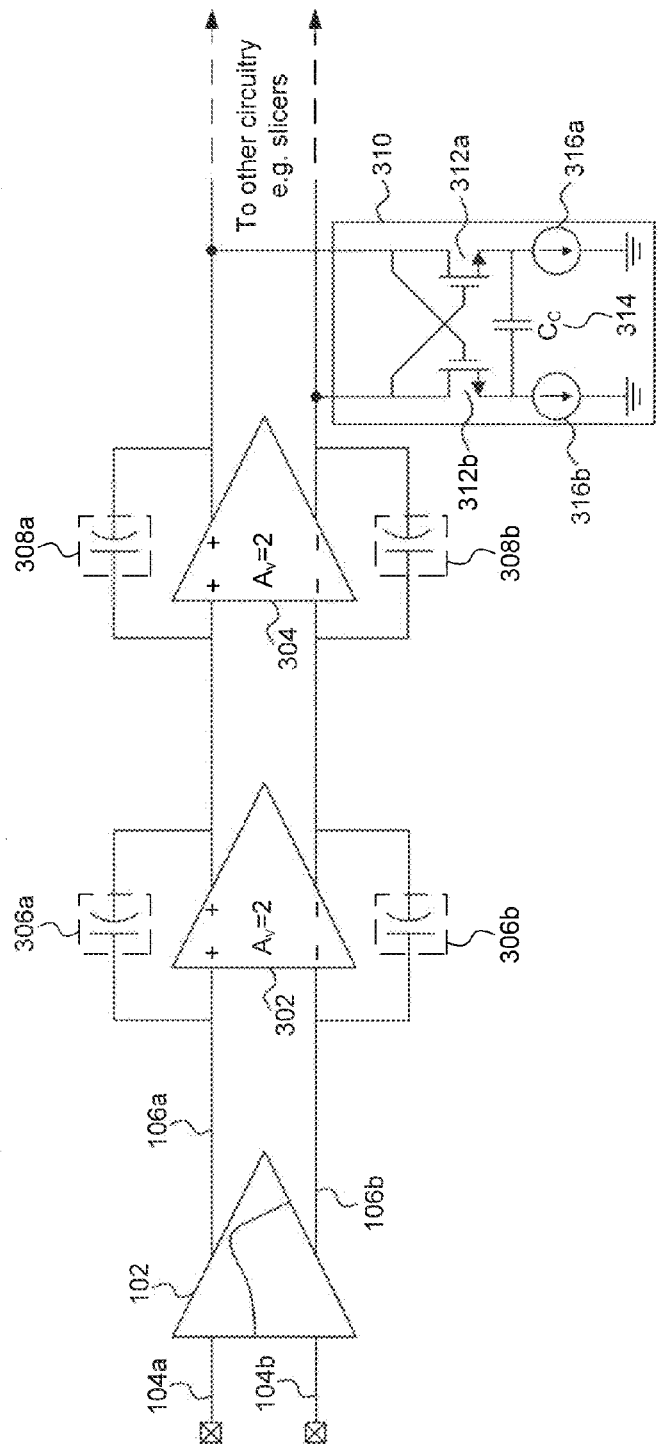
FIG. 3 illustrates a portion of an example receiver front-end circuit according to an embodiment of the present disclosure.

FIG. 3 illustrates a portion of an example receiver front-end circuit 300 according to an embodiment of the present disclosure. Example circuit 300 is provided for the purpose of illustration only and is not limiting of embodiments of the present disclosure. As shown in FIG. 3, receiver front-end circuit 300 includes peaking equalizer 102, amplifiers 302 and 304, capacitors 306a-b and 308a-b, and a capacitively-degenerated cross-coupled differential pair circuit 310.

Peaking equalizer 102 is configured to receive differential input data signals 104a and 104b, and to generate differential output data signals 106a and 106b. Differential output data signals 106a and 106b are coupled to amplifiers 302 and 304, before being provided to other circuitry, such as data slicers, for example.

Capacitors 306a-b couple the input terminals and the output terminals of amplifier 302 in a positive feedback manner. As such, for each respectively coupled input terminal and output terminal, a portion of the output signal adds in phase with the input signal, augmenting the input signal (e.g., loop gain is positive). Capacitors 308a-b couple the input terminals and the output terminals of amplifier 304 in a positive feedback manner. Circuit 310 is coupled to the output terminals of amplifier 304. In an embodiments, capacitors 306a-b and 308a-b are floating metal capacitors.

As shown in FIG. 3, example circuit 300 does not use inductors for bandwidth extension of equalizer 102, amplifier 302, and amplifier 304. Instead, as further described below, example circuit 300 relies on amplifier 302 and capacitors 306a-b to extend the bandwidth of equalizer 102, on amplifier 304 and capacitors 308a-b to extend the bandwidth of amplifier 302, and on circuit 310 to extend the bandwidth of amplifier 304.

As discussed above with respect to FIG. 2, embodiments operate by emulating a negative capacitance at the output of a stage whose bandwidth is being extended. In example circuit 300, amplifier 302 and capacitors 306a-b are configured to emulate the presence of a negative capacitance at the outputs of equalizer 102. Similarly, amplifier 304 and capacitors 308a-b are configured to emulate the presence of a negative capacitance at the outputs of amplifier 302. This negative capacitance is due to the Miller effect created by the coupling of capacitors 306a-b (capacitors 308a-b) in a positive feedback around amplifier 302 (amplifier 304). The Miller effect of this coupling is further described below with respect to an example 400 shown in FIG. 4.

Figure 4:
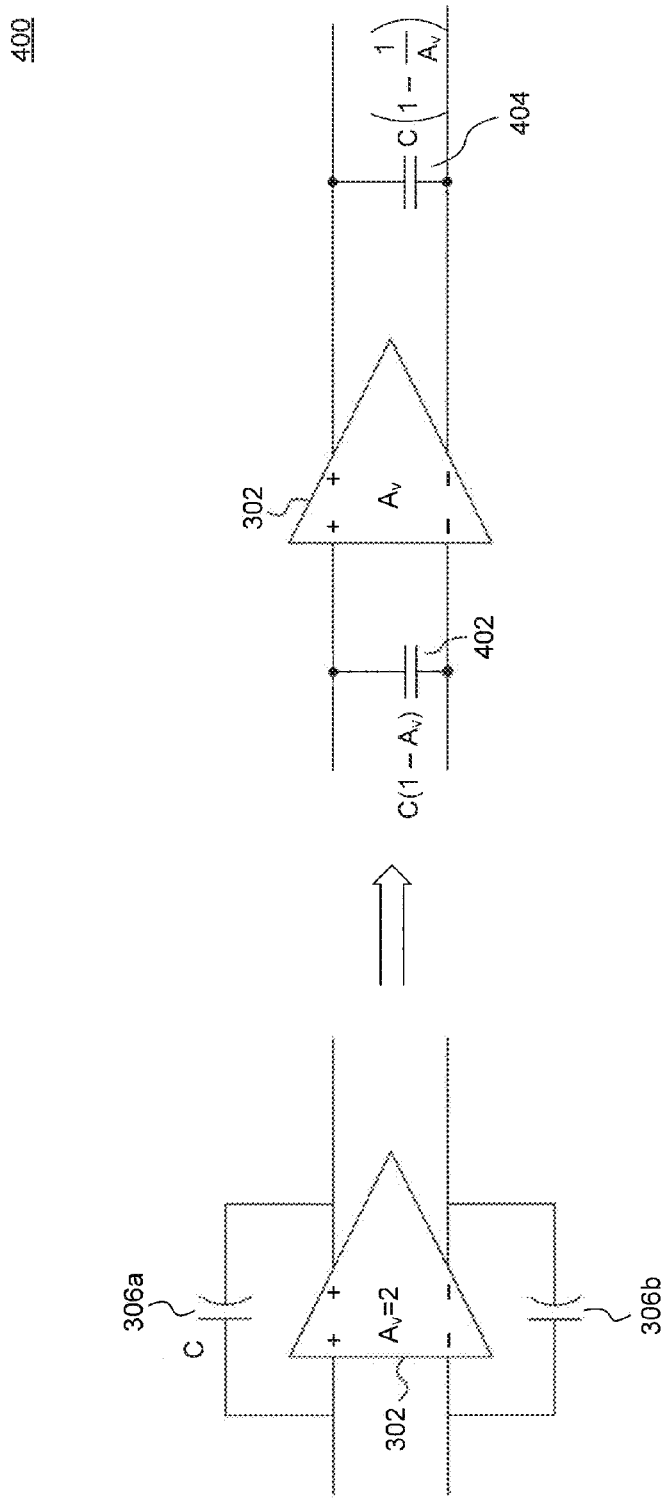
FIG. 4 is an example that illustrates the Miller effect with respect to an example amplifier according to an embodiment of the present disclosure.

FIG. 4 is an example 400 that illustrates the Miller effect with respect to an example amplifier according to an embodiment of the present disclosure. In particular, example 400 illustrates the equivalent circuit of the circuit structure comprised of amplifier 302 and capacitor 306a, coupled around amplifier 302 in a positive feedback manner.

As shown in FIG. 4, the equivalent circuit includes amplifier 302, a first Miller capacitance 402, coupled as an input capacitance at an input terminal of amplifier 302, and a second Miller capacitance 404, coupled as an output capacitance at an output terminal of amplifier 302. The value of first capacitance 402 is given by $C(1-A_v)$, where C is the capacitance of capacitor 306a and $A_v$ is the gain of amplifier 302. The value of second capacitance 404 is given by $C(1-1/A_v)$.

For values of $A_v$ greater than 1, the value of first capacitance 402 is negative and the value of second capacitance 404 is positive. For example, for $A_v=2$, the value of first capacitance 402 is "–C" and the value of second capacitance 404 is "+C/2." Thus, the equivalent circuit includes a negative Miller capacitance and a positive Miller capacitance.

Referring back to FIG. 3, in an embodiment, amplifier 302 and capacitors 306a-b are configured to produce a negative capacitance at each output of equalizer 102. In an embodiment, the configuration involves selecting an appropriate gain $A_v$ of amplifier 302 and an appropriate value for capacitors 306a-b such that the resultant Miller negative capacitance (e.g., equivalent to first capacitance 402 in FIG. 4) is equal or substantially equal (in absolute value) to the output load capacitance of equalizer 102 (e.g., equivalent to capacitor 202 in FIG. 2).

In another embodiment, amplifier 302 and capacitors 306a-b are configured to produce a negative capacitance that is slightly lower (in absolute value) than the output load capacitance of equalizer 102. This prevents the negative capacitance from exceeding (e.g., due temperature, process, and part-to-part variations) the output load capacitance being compensated and equalizer 102 from exhibiting peaking behaviors (where high frequencies are amplified significantly more than lower frequencies).

Similarly, in an embodiment, amplifier 304 and capacitors 308a-b are configured to produce a negative capacitance at each output of amplifier 302. In an embodiment, the configuration involves selecting an appropriate gain $A_v$ of amplifier 304 and an appropriate value for capacitors 308a-b such that the resultant negative capacitance (e.g., equivalent to first capacitance 402 in FIG. 4) is equal or substantially equal (in absolute value) to a combined capacitance of the output load capacitance of amplifier 302 (e.g., equivalent to capacitor 202 in FIG. 2) and the positive capacitance (e.g., equivalent to second capacitance 404) created by amplifier 302 and capacitors 306a-b.

In another embodiment, amplifier 304 and capacitors 308a-b are configured to produce a negative capacitance that is slightly lower (in absolute value) than the combined capacitance, to prevent the negative capacitance from exceeding (e.g., due temperature, process, and part-to-part variations) the combined capacitance and amplifier 304 from exhibiting peaking behaviors (where high frequencies are amplified significantly more than lower frequencies).

As would be understood by a person of skill in the art based on the teachings herein, the above described bandwidth extension approach can be applied successively irrespective of the number of equalizer and amplifier stages. For example, example circuit 300 may include any number of equalizers, such as equalizer 102, and amplifiers, such as amplifiers 302 and 304, with each stage (e.g., amplifier 302 or 304) used to extend the bandwidth of the stage (or stages) that precedes it by reducing or cancelling its output load capacitance. This approach can thus be used to extend the bandwidth of every stage of a receiver front-end circuit, except for the final stage (e.g., amplifier 304), which is typically followed by a bit slicer, for example.

In an embodiment, as shown in FIG. 3, the bandwidth of the final amplifier stage 304 is extended using a circuit 310, coupled to the output terminals of amplifier 304. Circuit 310 emulates the presence of a negative capacitance at each output terminal of amplifier 304. In an embodiment, the negative capacitance is equal or substantially equal to a combined capacitance of the output load capacitance of amplifier 304 (e.g., capacitor 202 in FIG. 2) and the positive capacitance (e.g., second capacitance 404) created by amplifier 304 and capacitors 308a-b. In an embodiment, circuit 310 includes a cross-coupled NMOS differential pair 312a-b, current sources 316a-b, and degenerating capacitor 314. Differential pair transistors 312a-b are capacitively-degenerated by capacitor 314.

In addition to bandwidth extension, receiver front-end circuits may require compensation of device offsets. Since device offsets typically change over voltage, temperature, and time, the offset compensation should adjust its correction in a continuous manner. Conventionally, offset compensation is provided by an analog feedback loop. Accordingly, the feedback loop is maintained continuously on, which results in significant power consumption. Further, to reduce the bandwidth of the feedback loop (to pass DC only), large capacitors are typically used in the loop, thus also requiring a large area for the loop circuit implementation.

Figure 5:
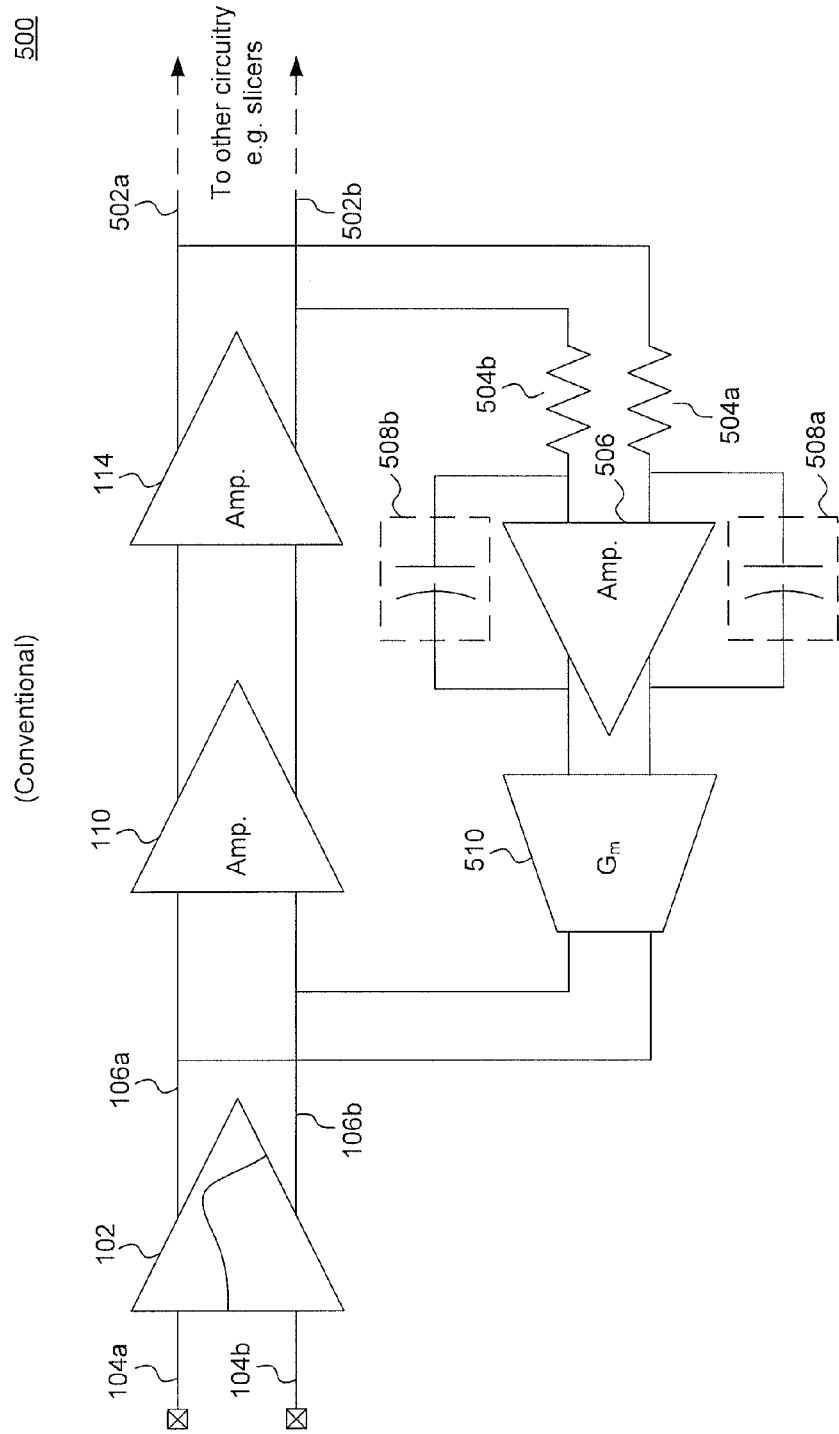
FIG. 5 illustrates a portion of a conventional receiver front-end circuit.

FIG. 5 illustrates a portion of a conventional receiver front-end circuit 500. As shown in FIG. 5, receiver front-end circuit 500 includes a peaking equalizer 102, followed by a plurality of amplifiers 110 and 114.

Peaking equalizer 102 is configured to receive differential input data signals 104a and 104b, and to generate differential output data signals 106a and 106b. Differential output data signals 106a and 106b are coupled to amplifiers 110 and 114, before being provided to other circuitry, such as data slicers, for example. Amplifiers 110 and 114 may be limiting amplifiers, configured to attenuate the portions of signals 106a and 106b that are above a certain level, in order to prevent saturation of subsequent stages.

Circuit 500 further includes an analog feedback loop to provide offset compensation. The analog feedback loop includes resistors 504a-b, an amplifier 506, capacitors 508a-b, and a transconductance stage 510. Resistors 504a-b couple outputs 502a-b of amplifier 114 to respective input terminals of amplifier 506. Capacitors 508a-b couple respective input terminals of amplifier 506 to respective output terminals of amplifier 506. Transconductance stage 510 is coupled between output terminals of amplifier 506 and input ten finals of amplifier 110.

As mentioned above, the analog feedback loop of circuit 500 is maintained on continuously, which results in increased power consumption. In addition, capacitors 508a-b are selected to be relatively large in order to reduce the bandwidth of the analog feedback loop, thereby passing DC components only of outputs 502a-b of amplifier 114. As a result, the analog feedback loop is both power consuming and large in area.

Embodiments of the present disclosure, as further described below, enable DC offset compensation with the use of a digital feedback loop. As such, the feedback loop can be turned on/off as needed, reducing its power consumption. In addition, large area capacitors can be eliminated, leading to a reduced circuit implementation size.

Figure 6:
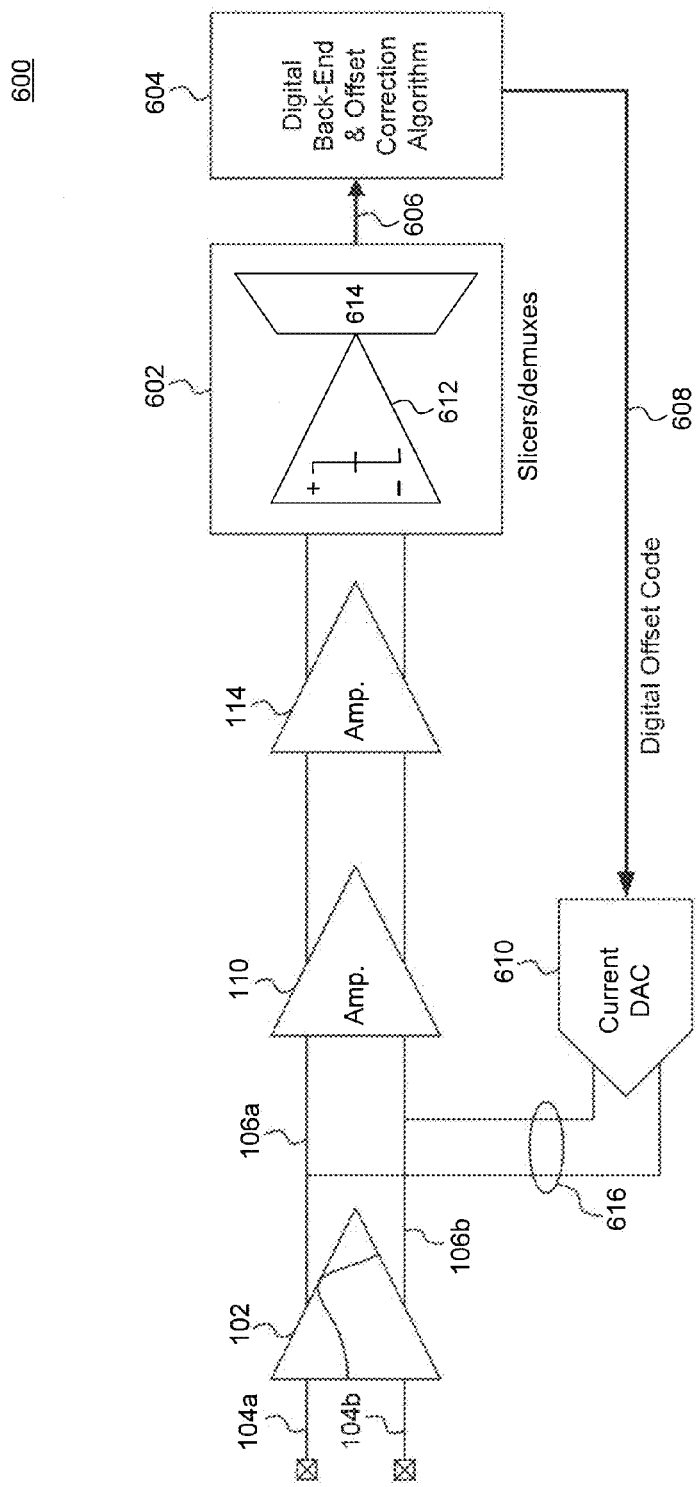
FIG. 6 illustrates a portion of a receiver front-end circuit according to an embodiment of the present disclosure.

FIG. 6 illustrates a portion of a receiver circuit 600 according to an embodiment of the present disclosure. Example circuit 600 is provided for the purpose of illustration only and is not limiting of embodiments of the present disclosure. As shown in FIG. 6, circuit 600 includes equalizer 102, amplifiers 110 and 114, a slicer module 602, a digital offset correction module 604, and a current digital-to-analog converter (DAC) 610.

As would be understood by a person of skill in the art based on the teachings herein, in other embodiments, amplifiers 110 and 114 may be replaced with the circuit structure provided by amplifiers 302 and 304, capacitors 306a-b and 308a-b, and circuit 310 described above in FIG. 3, in order to extend the bandwidth of the receiver front-end portion of receiver circuit 600.

As shown in FIG. 6, offset compensation in receiver circuit 600 is performed in the digital domain. Accordingly, the outputs of amplifier 114 are first provided to slicer module 602. Slicer module 602 may include a bit slicer 612 and a demultiplexer 614. Bit slicer 612 generates soft/hard bit decisions based on the outputs of amplifier 114 and provides the bit decisions to demultiplexer 614. Demultiplexer 614 demultiplexes the bit decisions into a parallel bit steam 606, which is then provided to digital offset correction module 604.

Digital offset correction module 604, together with current DAC 610, form a digital feedback loop. In an embodiment, digital offset correction module 604 is configured to determine the presence of DC offset based on parallel bit stream 606. In an embodiment, module 604 determines the presence of DC offset by monitoring the long-term DC-balance of bit stream 606. Typically, data being received by circuit 600 is DC balanced (e.g., the data includes equal or approximately equal numbers of 0's and 1's over a long time interval) due to applied line coding. A DC-unbalance is attributed to the presence of DC offset in the received data. Thus, in an embodiment, module 604 is configured to monitor bit stream 606 over a pre-determined time interval and to determine whether or not bit stream 606 is DC-balanced over the pre-determined time interval. The pre-determined time interval is selected based on the line coding applied to the received data.

In an embodiment, bit slicer 612 is part of a clock and data recovery (CDR) timing loop. When the CDR timing loop locks to the input signal phase, bit sheet 612 samples the output of amplifier 114 with the clock aligned with data transition edges. If an offset exists in the output of amplifier 114, it will result in an unbalanced number of 0s and 1s in the output of bit slicer 612. Module 604 uses this information to determine the direction and amount of correction needed.

In an embodiment, if digital module 604 determines a DC-unbalance (e.g., above a pre-determined threshold) in bit stream 606, digital module 604 generates and provides a digital offset code 608 to current DAC 610. Digital offset code 608 controls DAC 610 to generate a current 616. Current 616 is applied at the input of amplifier 110, and is configured to reduce the presence of DC offset at the input of amplifier 110. In other embodiments, current 616 may be applied to the input of equalizer 102 or amplifier 114.

In another embodiment, digital module 604 implements hysteresis such that the digital feedback loop is turned off when the DC offset is within a pre-determined range and turned on when the DC offset is outside of the pre-determined range. For example, in an embodiment, the digital feedback loop is disabled when the offset is within ±½ LSB (least significant bit). This hysteresis implementation prevents excessive corrections that add jitter and degrade the signal waveform at 106a-b.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:
1. A receiver front-end circuit, comprising:
an equalizer;
a first amplifier stage, coupled to an output of the equalizer, configured to produce a first capacitance at the output of the equalizer, wherein the produced first capacitance is configured to compensate for an output load capacitance of the equalizer, wherein the first amplifier stage includes a first amplifier and a first capacitor, wherein the first capacitor is coupled across the first amplifier using positive feedback, and wherein a gain of the first amplifier and a capacitance of the first capacitor are configured such that the produced first capacitance is equal or substantially equal in absolute value to the output load capacitance of the equalizer; and a second amplifier stage, coupled to an output of the first amplifier stage, configured to produce a second capacitance at the output of the first amplifier stage, wherein the produced second capacitance is configured to compensate for an output load capacitance of the first amplifier stage, wherein the first amplifier stage is further configured to produce a third capacitance, and wherein the produced second capacitance is further configured to compensate for a combined capacitance of the output load capacitance of the first amplifier stage and the produced third capacitance.

2. The receiver front-end circuit of claim 1, wherein the gain of the first amplifier and the capacitance of the first capacitor are configured such that the produced first capacitance is negative.

3. The receiver front-end circuit of claim 1, wherein the third capacitance is produced at the output of the first amplifier.

4. The receiver front-end circuit of claim 3, wherein the second amplifier stage comprises:
a second amplifier; and
a second capacitor coupled, in a positive feedback, across the second amplifier.

5. The receiver front-end circuit of claim 4, wherein a gain of the second amplifier and a capacitance of the second capacitor are configured such that the produced second capacitance is equal or substantially equal in absolute value to a combined capacitance of the output load capacitance of the first amplifier stage and the produced third capacitance.

6. The receiver front-end circuit of claim 4, wherein a gain of the second amplifier and a capacitance of the second capacitor are configured such that the produced second capacitance is negative.

7. The receiver front-end circuit of claim 4, wherein the second amplifier stage comprises:
a capacitively-degenerated cross-coupled transistor pair, coupled to an output of the second amplifier, and configured to compensate for an output load capacitance of the second amplifier.

8. The receiver front-end circuit of claim 1, wherein the first amplifier stage is configured to extend a frequency bandwidth of the equalizer.

9. A receiver, comprising:
a receiver front-end circuit, comprising:
an equalizer;
a first amplifier stage, coupled to an output of the equalizer, configured to produce a first capacitance at the output of the equalizer, wherein the produced first capacitance is configured to compensate for an output load capacitance of the equalizer; and
a second amplifier stage, coupled to an output of the first amplifier stage, configured to produce a second capacitance at the output of the first amplifier stage, wherein the produced second capacitance is configured to compensate for an output load capacitance of the first amplifier stage, wherein the first amplifier stage is further configured to produce a third capacitance, and wherein the produced second capacitance is further configured to compensate for a combined capacitance of the output load capacitance of the first amplifier stage and the produced third capacitance;

a bit slicer module configured to receive an output of the receiver front-end circuit and to generate a parallel bit stream; and a digital offset correction module configured to:
determine whether or not the parallel bit stream is DC-balanced over a pre-determined time interval; and
generate a digital offset code in response to determining that the parallel bit stream is not DC-balanced over the pre-determined time interval.

10. The receiver of claim 9, wherein the first amplifier stage comprises:
a first amplifier; and
a first capacitor coupled, in a positive feedback, across the first amplifier,
wherein a gain of the first amplifier and a capacitance of the first capacitor are configured such that the produced first capacitance is equal or substantially equal in absolute value to the output load capacitance of the equalizer.

11. The receiver of claim 9, wherein the bit slicer module is configured to sample, at data transition edges, the output of the receiver front-end circuit to produce a DC unbalance in the parallel bit stream when offset is present in the output of the receiver front-end circuit.

12. The receiver of claim 9, further comprising:
a current digital-to-analog converter (DAC) configured to produce a current based on the digital offset code and to apply the produced current to an input of the first amplifier stage.

13. A receiver front end circuit, comprising:
a first amplifier stage;
a second amplifier stage, coupled to an output of the first amplifier stage and configured to produce a negative capacitance at the output of the first amplifier stage, wherein the produced negative capacitance is configured to compensate for an output load capacitance of the first amplifier stage, wherein the first amplifier stage is further configured to produce a first capacitance, and wherein the produced negative capacitance is further configured to compensate for a combined capacitance of the output load capacitance of the first amplifier stage and the produced first capacitance;

a bit slicer module configured to receive an output of the second amplifier stage and to generate a parallel bit stream; and a digital offset correction module configured to:
determine whether or not the parallel bit stream is DC-balanced over a pre-determined time interval; and
generate a digital offset code in response to determining that the parallel bit stream is not DC-balanced over the pre-determined time interval.

14. The receiver of claim 13, wherein the second amplifier stage comprises:
a second amplifier; and
a second capacitor coupled, in a positive feedback, across the second amplifier.

15. The receiver of claim 14, wherein a gain of the second amplifier and a capacitance of the second capacitor are configured such that the produced negative capacitance is equal or substantially equal in absolute value to the combined capacitance of the output load capacitance of the first amplifier stage and the produced first capacitance.

16. The receiver of claim 13, further comprising:
a digital to analog converter (DAC), configured to receive the digital offset code and generate an analog signal and to apply the analog signal to an input of the first amplifier stage.

17. The receiver of claim 16, wherein the DAC is a current DAC and the analog signal is an analog current responsive to the digital offset code.

18. The receiver of claim 16, wherein the analog signal is configured to correct the DC balance of the parallel bit stream.

19. The receiver of claim 9, further comprising a cross-coupled transistor pair, coupled to an output of the second amplifier stage, and configured to generate a negative capacitance to compensate for an output load capacitance of the second amplifier stage.

20. The receiver of claim 19, wherein the cross-coupled transistor pair is capacitively-degenerated by a capacitor connecting respective sources of the cross-coupled transistor pair.

* * * * *